(12) United States Patent
Zhou

(10) Patent No.: US 8,166,660 B2
(45) Date of Patent: May 1, 2012

(54) RECIPROCATING SAW

(75) Inventor: Hongtao Zhou, Nanjing (CN)

(73) Assignee: Chervon Limited, Wanchai (HK)

( * ) Notice: Subject to any disclaimer, the term of this patent is extended or adjusted under 35 U.S.C. 154(b) by 461 days.

(21) Appl. No.: 12/383,021

(22) Filed: Mar. 19, 2009

(65) Prior Publication Data

US 2009/0241354 A1  Oct. 1, 2009

(30) Foreign Application Priority Data

Mar. 28, 2008  (CN) ...................... 2008 2 0033942 U
Oct. 16, 2008  (CN) ...................... 2008 2 0119562 U

(51) Int. Cl.
  *B23D 49/16* (2006.01)
  *B27B 19/09* (2006.01)
(52) U.S. Cl. ................. 30/393; 30/392; 30/394
(58) Field of Classification Search .......... 30/392, 30/393, 394; 83/747; 74/25, 27, 49
  See application file for complete search history.

(56) References Cited

U.S. PATENT DOCUMENTS

| | | | | |
|---|---|---|---|---|
| 3,547,166 A | * | 12/1970 | Dudek | .......... 83/698.21 |
| 3,810,408 A | | 5/1974 | Taira et al. | |
| 3,876,015 A | | 4/1975 | Kivela | |
| 4,385,443 A | * | 5/1983 | O'Banion | .......... 30/393 |
| 4,545,123 A | * | 10/1985 | Hartmann | .......... 30/393 |
| 4,693,009 A | * | 9/1987 | Bone | .......... 30/392 |
| 5,832,611 A | * | 11/1998 | Schmitz | .......... 30/392 |
| 5,940,977 A | * | 8/1999 | Moores, Jr. | .......... 30/392 |
| 7,096,589 B2 | * | 8/2006 | Phillips et al. | .......... 30/392 |
| 7,204,026 B2 | | 4/2007 | Phillips et al. | |

FOREIGN PATENT DOCUMENTS

| | | |
|---|---|---|
| DE | 2621053 | 12/1977 |
| EP | 0535563 | 4/1993 |
| EP | 1598135 | 11/2005 |
| JP | 2006272485 | 10/2006 |
| SE | 502200 | 9/1995 |
| WO | WO83/00836 | 3/1983 |
| WO | WO99/19123 | 4/1999 |

OTHER PUBLICATIONS

Search Report for British App. No. GB0904887.7 dated Apr. 27, 2009.
Search Report for British App. No. GB0904876.0 dated May 8, 2009.

* cited by examiner

*Primary Examiner* — Hwei C Payer
(74) *Attorney, Agent, or Firm* — McDermott Will & Emery LLP

(57) ABSTRACT

A reciprocating saw having a housing, a reciprocating shaft unrotatably connected to a blade, a rear handle and a forward handle, the forward handle being rotatably mounted to the housing near the blade and capable of sliding relative to the reciprocating shaft, but incapable of rotating relative to the reciprocating shaft. The forward handle comprises at least one hole, the reciprocating saw further includes a button connected to a locking element for engaging or disengaging with the at least one hole. The reciprocating saw is easy and comfortable to operate.

9 Claims, 5 Drawing Sheets

RECIPROCATING SAW

CROSS-REFERENCE TO RELATED APPLICATIONS

This application claims priority under 35 U.S.C. 119 to Chinese Patent Application No. 200820033942.X filed Mar. 28, 2008, and Chinese Patent Application No. 200820119562.8, filed Oct. 16, 2008, both of which are hereby incorporated by reference.

FEDERALLY SPONSORED RESEARCH OR DEVELOPMENT

Not Applicable.

TECHNICAL FIELD

The present invention relates to power tools and, more particularly, to a reciprocating saw having a rotatable blade.

BACKGROUND OF THE INVENTION

A reciprocating saw generally includes a housing, a blade, a rear handle fixedly mounted to a rear end of the housing, and a motor mounted in the housing to drive the blade to do reciprocating movements. The blade is located at one end of the housing opposite the rear handle, and a forward handle is formed at the front end of the housing near the blade. Traditional reciprocating saws tend to lack adjustability, thus making them less useful in limited spaces.

In operation, the operator holds the forward handle and the rear handle respectively with both hands. To satisfy the requirement of different cutting directions, the orientation of the saw blade in relation to the rear handle is preferably adjustable so as to make the operation more comfortable.

U.S. Pat. No. 7,096,589 discloses a reciprocating saw having a blade which is rotated by swiveling a forward handle. Usually during the blade rotation the operator must hold down a locking element, and swivel the forward handle simultaneously. When the blade is rotated to a certain angle, the locking element is released and the forward handle is locked so that the rotation angle of the blade is achieved. Since the operator must always hold down the locking element while swiveling the forward handle, the operation is inconvenient and uncomfortable with such a structure. The present invention provides a reciprocating saw that the operator can quickly and easily rotate a blade relative to a rear handle.

SUMMARY OF THE INVENTION

The present invention provides a reciprocating saw which comprises a housing, a reciprocating shaft unrotatably connected relative to a blade, and rear handle, a forward handle rotatably mounted to the housing near the blade, the forward handle being capable of sliding relative to the reciprocating shaft, but incapable of rotating relative to the reciprocating shaft. The forward handle comprises at least one hole located thereon. The reciprocating saw further comprises a button connected to a locking element, and the locking element is capable of engaging or disengaging with the at least one hole of the forward handle.

The locking element can be disengaged from the at least one hole of the forward handle by moving the locking element through operation of the button, so that the forward handle can then be swiveled relative to the housing. Because the forward handle can not rotate relative to the reciprocating shaft and the blade is fixedly connected to the reciprocating shaft, swiveling the forward handle results in the blade being rotated relative to the housing. When the blade is rotated to a desired angle, the locking element can engage with the at least one hole of the forward handle with the aid of operating the button so that the forward handle can be locked to the housing. This operation is very easy and comfortable.

In another aspect of the present invention, a reciprocating saw comprises a housing, a reciprocating shaft unrotatably connected to a blade, a rear handle, and a forward handle rotatably mounted to the housing near the blade and being capable of sliding relative to the reciprocating shaft, but incapable of rotating relative to the reciprocating shaft. At least one hole is positioned within the forward handle. The reciprocating saw further comprises a locking element for engaging or disengaging with the at least one hole. A button having a rotatable shaft with a cam surface, wherein the cam surface cooperates with the reciprocating shaft to drive the reciprocating shaft to swing around a shaft mounted in the housing. The button further cooperates with the locking element to change the orientation of the blade.

With such a structure, when the locking element engages with the at least one hole, the relative position between the cam surface and the reciprocating shaft results in the cutting direction of the blade consisting with the swing direction of the reciprocating saw. Alternatively, when the locking element disengages from the at least one hole, the relative position between the cam surface and the reciprocating shaft results in movement of the blade of the reciprocating saw in the reciprocating direction only, not in a swing direction.

DETAILED DESCRIPTION

Figure 1:
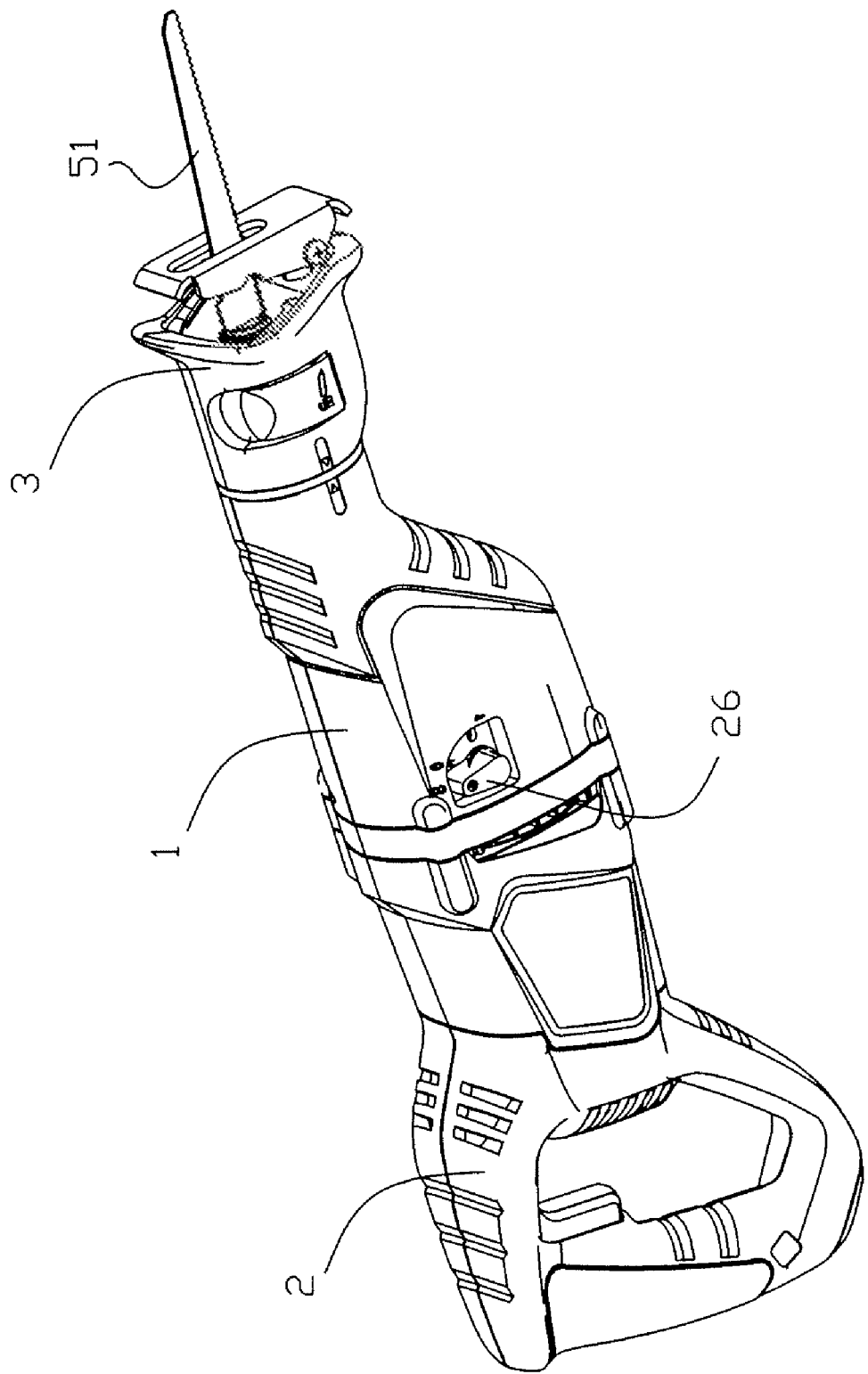
FIG. 1 is a perspective view of a reciprocating saw of a preferred embodiment according to the present invention.
Figure 2:
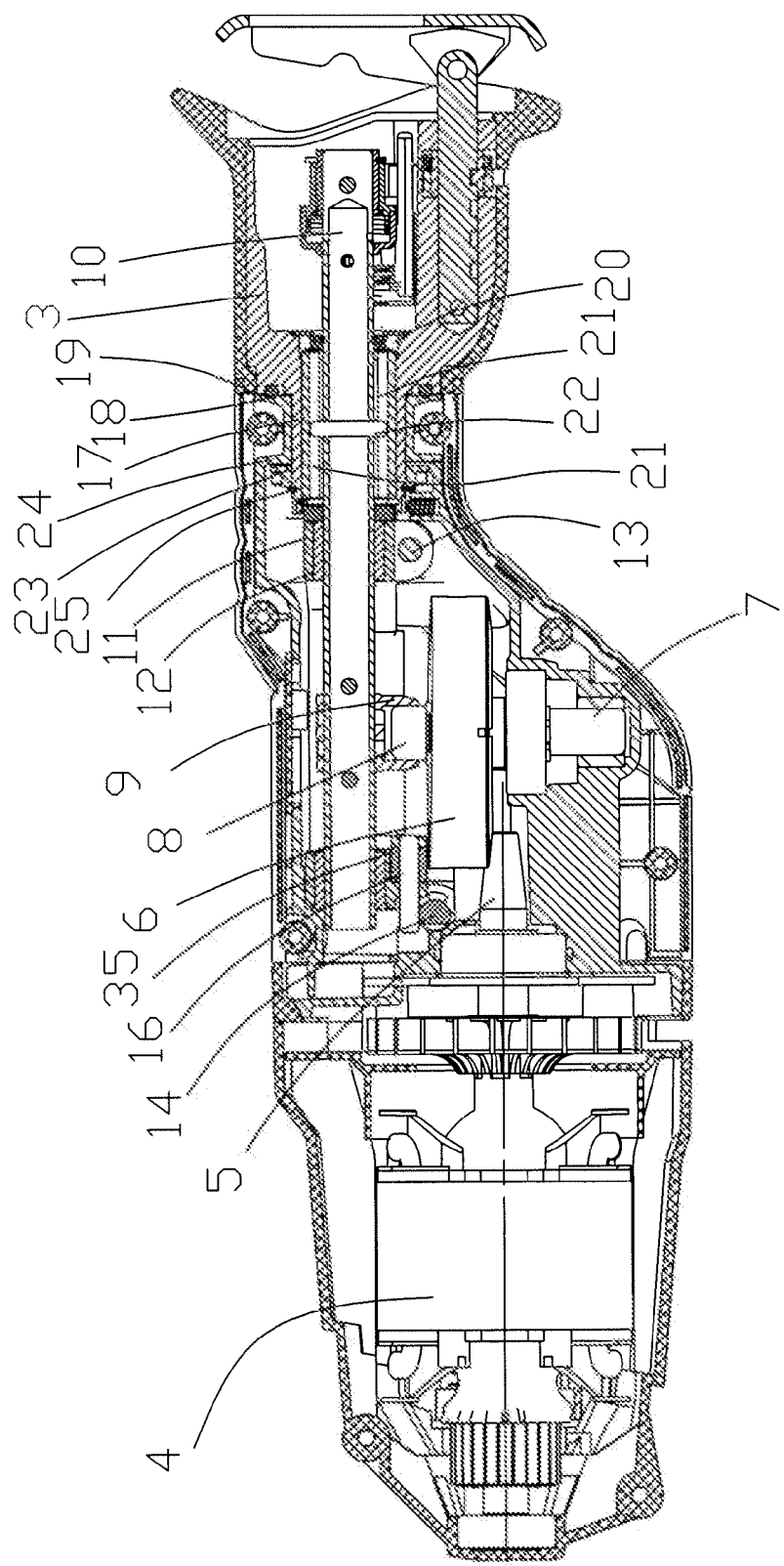
FIG. 2 is partial cutaway view of the reciprocating saw shown in FIG. 1 with a rear handle being removed.
Figure 3:
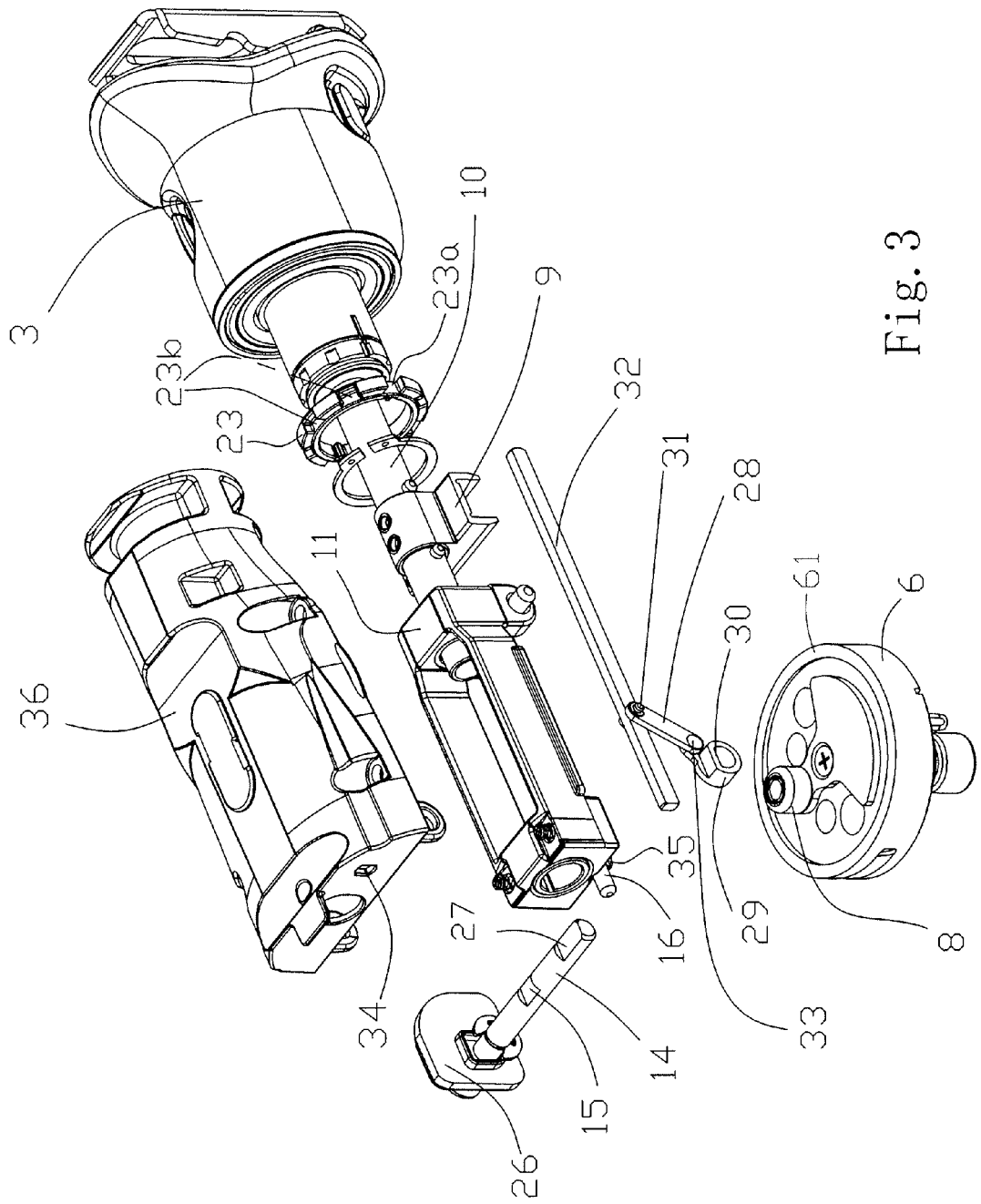
FIG. 3 is an exploded view of a portion of the reciprocating saw shown in FIG. 1.

Referring to FIGS. 1-3, a reciprocating saw of a preferred embodiment according to the present invention comprises a housing 1, a rear handle 2 fixedly mounted to the housing 1, a gear case cover 36 mounted in the housing, and a motor 4 mounted in the housing 1. The motor 4 has an output shaft 5, and a taper teeth portion formed on the output shaft 5. The taper teeth portion engages with a gear 6 which is mounted on the shaft 7. The gear 6 is driven to rotate through the rotation of the motor 4. A protuberance 8 is formed on the gear 6 and deviated from a shaft axis of the gear 6. The protuberance 8 protrudes into a yoke-shaped transmission element 9 fastened to a reciprocating shaft 10 while the reciprocating shaft 10 is slidably mounted in a slot 12 of a bracket 11, so that the rotation of the gear 6 drives the protuberance 8 to rotate about the shaft 7, which consequently drives the transmission element 9 and the reciprocating shaft 10 to do reciprocating motions.

The bracket 11 can be driven to rotate about a shaft 13 which is fixedly mounted to the housing so as to drive the reciprocating shaft 10 to swing around the shaft 13. The swing of the reciprocating shaft 10 is transferred to a blade 51 simultaneously so as to make the blade 51 swing back and forth. For a cutting period in cutting operation to the workpiece, the blade 51 is driven to swing forward to help improve the cutting efficiency, and then the blade 51 is driven to swing backward in order to reduce wear of the blade teeth. The swing direction of the reciprocating shaft 10, namely the swing direction of the blade 51, should be consistent with the cutting direction of the blade 51. In other words, the blade 51 should swing in its cutting plane, otherwise the reciprocating saw will not work normally.

A button 26 is mounted in the housing in a common manner and is kept at a suitable position. The button 26 includes a rotatable shaft 14. A cam surface 15, which is formed on the circumferential surface of a middle part of the rotatable shaft 14, is in contact with a pin 16 which is fixedly mounted to the bracket 11. A roller bearing 35 is mounted on the pin 16. Through rotating the button 26, the pin 16 can bring the roller bearing 35 away from a top surface of the gear 6 when a highest point of the cam surface 15 contacts the pin 16, and alternatively the roller bearing 35 can come into contact with the top surface of the gear 6 when a lowest point of the cam surface 15 contacts the pin 16. The surface of the gear 6 adjacent to the roller bearing 35 is a sloping surface 61 which inclines relative to the shaft 7 by a certain angle, thus, the sloping surface 61 move in a cycle rotating motion around the rotating shaft of the gear 6 to push the roller bearing 35 to move back and forth when the gear 6 rotates so that the bracket 11 will rotate around the shaft 13. In this state, the reciprocating shaft 10 is located at a position close to the sloping surface 61 of the gear 6 and does cycle swing motions resulting from pushing force of the sloping surface 61 together with reciprocating motions.

Referring to FIG. 2, a forward handle 3 has a neck portion 17, a flange surface 18, and an internal hole 20. A pair of guide slots 21 is formed in the internal hole 20. A guide pin 22 is fixedly mounted to the reciprocating shaft 10. The forward handle 3 is slidably mounted to the reciprocating shaft 10 by the cooperation of the guide slots 21 in the forward handle and the guide pin 22 in the reciprocating shaft. The flange surface 18 of the forward handle contacts a flange surface 19 of the housing 1. A flange 23 is mounted to the rear end of the neck portion 17 of the forward handle 3, which contacts another flange surface 24 of the housing, and is fixed in the housing through an elastic ring 25, limiting the axial movement of the forward handle. With such a structure, the forward handle 3 can not rotate relative to the reciprocating shaft 10 when the reciprocating shaft 10 slides relative to the forward handle 3.

Figure 4:
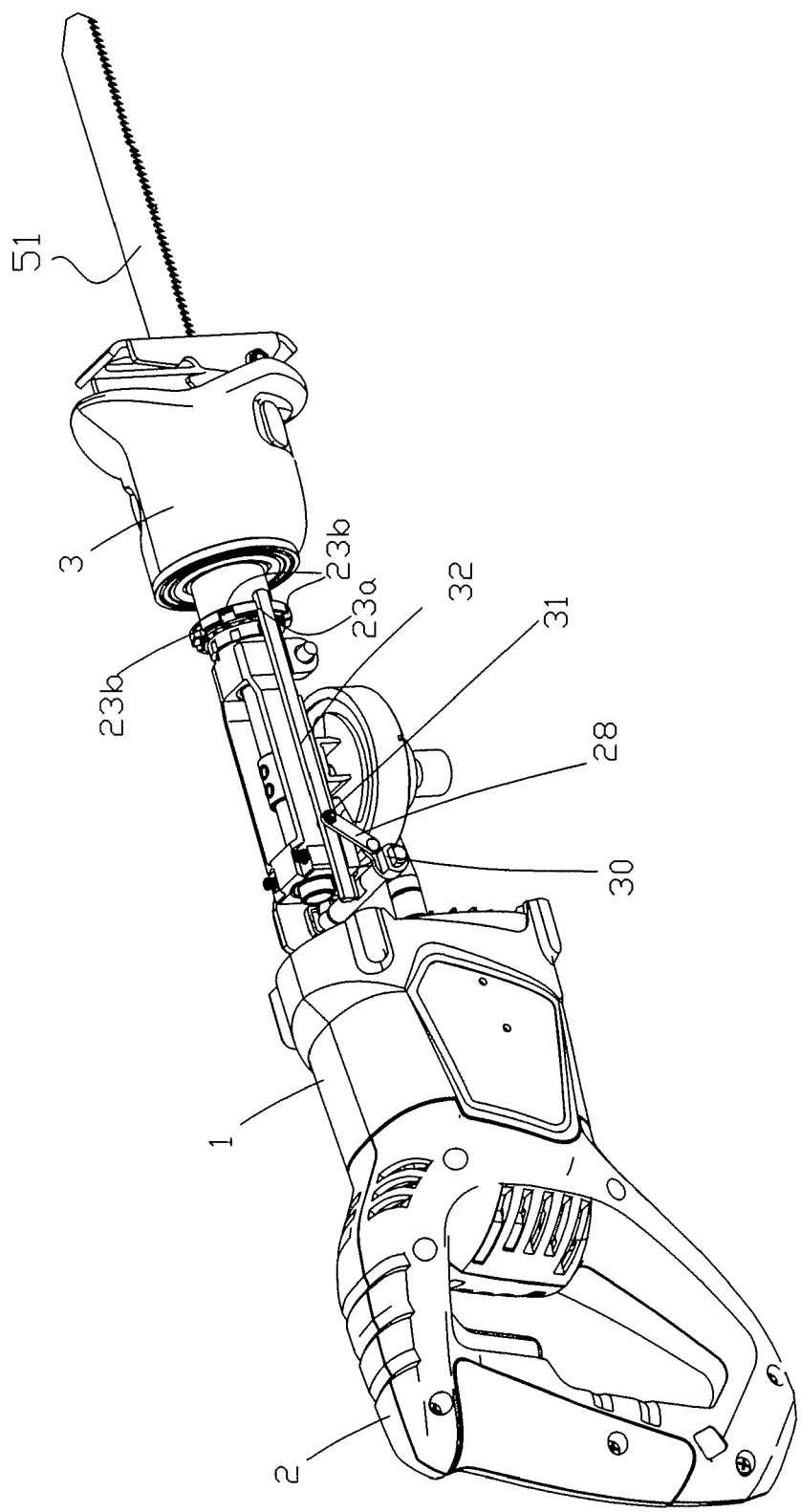
FIG. 4 is a perspective view of the reciprocating saw shown in FIG. 1 with the blade being in an orbital position and the housing being removed.
Figure 5:
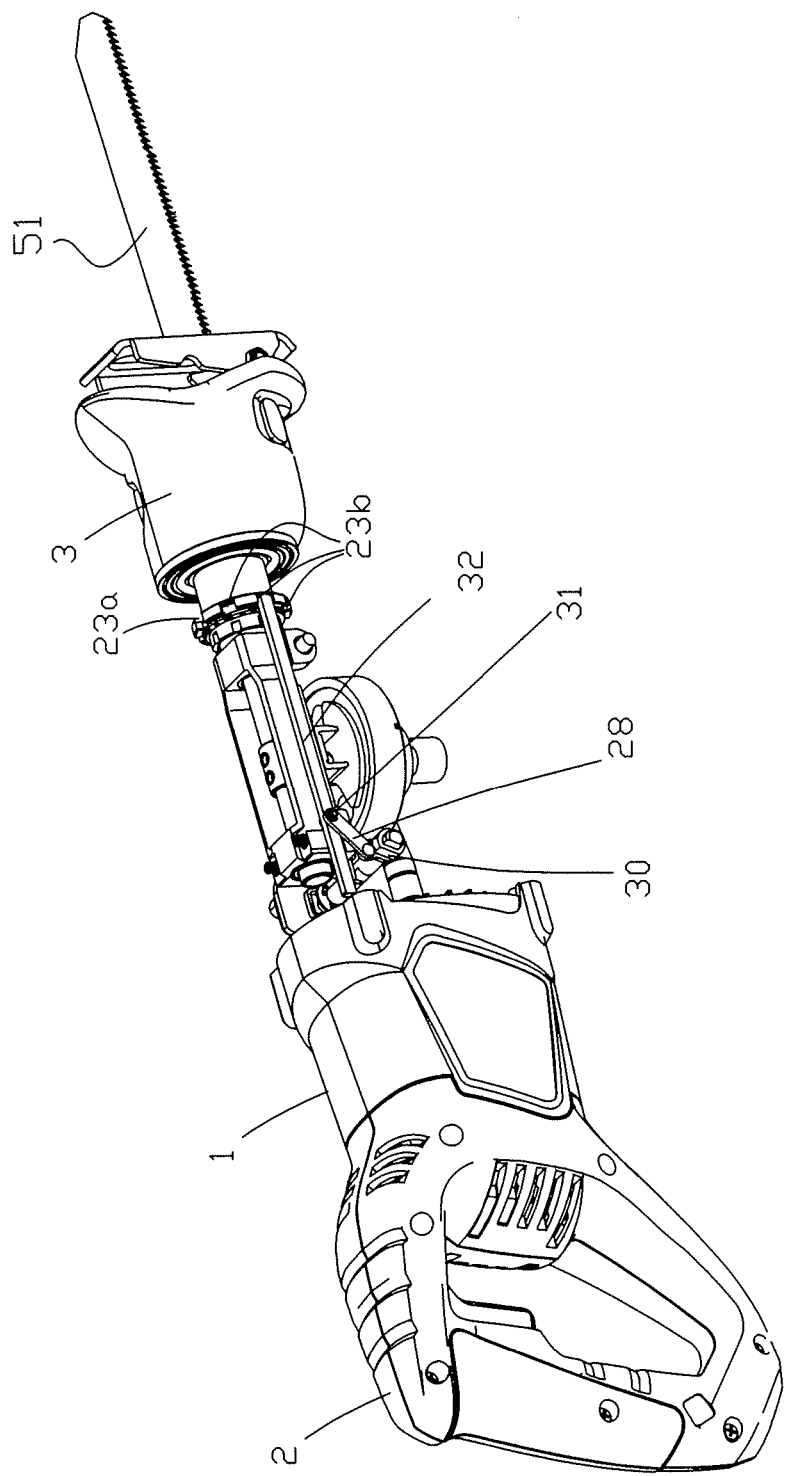
FIG. 5 is a perspective view of the reciprocating saw shown in FIG. 1 with the blade being in a non-orbital position and the housing being removed.

As shown in FIG. 3 and FIG. 4, a series of holes 23a, 23b are distributed uniformly on the circumferential surface of the flange 23. The pair of holes 23a which are centrosymmetric with each other are through-holes, while and the other holes 23b are counterbored holes. In other embodiments, the through-holes 23a may have a deeper depth along the longitudinal direction of the reciprocation shaft, and the counterbored holes 23b may have a shallower depth along the longitudinal direction of the reciprocation shaft. As shown in FIG. 4, the cutting direction of the blade 51 will be consistent with the swing direction of the reciprocating shaft 10 when a locking element 32 is inserted into one of the through-holes 23a. As shown in FIG. 5, the reciprocating shaft 10 cannot swing, but can only move in reciprocating motions when the locking element 32 is inserted into one of the counterbored holes 23b.

The button 26 is connected to the locking element as follows. The rotatable shaft 14 of the button includes a flat portion 27 formed on an end of the rotatable shaft opposite the button. One end of a rod 28 is pivotally connected to a sleeve 29 through a shaft 33, and a flat surface 30 is formed on the inner surface of the sleeve 29. The sleeve 29 is mounted to one end of the rotatable shaft 14 through the engagement between the flat surface 30 of the sleeve 29 and the flat portion 27 formed on the rotatable shaft 14. The other end of the rod 28 is pivotally connected the locking element 32 through a pivot shaft 31. A guide slot 34 is formed on the gear cover 36, and the locking element 32 is installed in the guide slot 34. In another embodiment, the button may comprise a pinion, the locking element may comprise a rack, and the rotation of the button is transformed into longitudinal movements of the locking element through the engagement between the pinion and rack. In other embodiments, the button may be connected to the locking element through a cam.

When the button 26 is rotated, the reciprocating shaft 10 will lie in a swing position when the lowest point of the cam surface 15 contacts the pin 16, with the cutting direction of the blade 51 consistent with the swing direction of the reciprocating shaft 10, which results in that the locking element 32, driven by the rod 28, can be slided in the guide slot 34 and inserted into one of the through-holes 23a of the flange 23. When the operator desires to change orientation of the blade 51, the button 26 is rotated to disengage the locking element 32 from one of the through-holes 23a of the flange 23, and the forward handle 3 is swiveled to position the locking element 32 to face one of the counterbored holes 23b. The blade 51 rotates along with the reciprocating shaft 10 by a certain angle, and then the button 26 is rotated reversely to make the highest point of cam surface 15 contact the pin 16, with a result that the roller bearing 35 is moved away from the sloping surface 61 of the gear 6. The bracket 11 fixedly mounted with the pin 16 in the roller bearing 35 is pushed to force the reciprocating shaft 10 away relative to the sloping surface 61, so that the reciprocating shaft 10 can not swing. At the same time, the locking element 32 engages one of the counterbored holes 23b of the flange 23, as shown in FIG. 5, thereby limited rotation of the button 26 by an inner bottom surface of the one of the counterbored hole 23b, so that the reciprocating shaft 10 can not reach the swing position.

In addition, the forward handle can be rotated to any position to perform the cutting operation according to the present invention. When the operator wants to change the orientation of the blade 51, the button 26 is rotated to disengage the locking element 32 from one of the through-holes 23a or one of the counterbored holes 23b of the flange 23, releasing the forward handle 3 so that the forward handle can swivel to a certain angle. The blade 51 thus is rotated by a certain angle along with the reciprocating shaft 10, and the locking element 32 is not positioned to any hole of the flange 23. The rotation of the button 26 will be limited by the surface of flange 23, which faces the locking element 32, so that the reciprocating shaft 10 can not reach the swing position. In this case, the forward handle is not locked, and any force produced in the cutting operation because of various factors, such as vibration, will effect the forward handle. However, the force is so minimal that it can be overcome easily by the operator with the forward handle being held steadily and being rotated controllably to any position so as to perform the cutting. In an alternative embodiment, the counterbored holes 23b may be eliminated, and only the through-holes 23a are retained.

The above described preferred embodiments are intended to illuminate the principle of the present invention, but not to limit its scope. It can be easily understood for those skilled in the art that many other modifications and variations of these preferred embodiments will be apparent and may be made without departing from the spirit and the scope of the invention as defined in the following claims.

What is claimed is:

1. A reciprocating saw comprising:
   a housing;
   a reciprocating shaft unrotatably connected relative to a blade;
   a rear handle;
   a forward handle between the housing and the blade, the forward handle being mounted to the housing near the blade and surrounding a portion of the reciprocating shaft, the reciprocating shaft being capable of sliding relative to the forward handle, but incapable of rotating relative to the forward handle, the forward handle further comprising at least one hole;
   a button, wherein the button comprises a rotatable shaft with a circumferential cam surface wherein the circumferential cam surface cooperates with the reciprocating shaft to swing the reciprocating shaft around a shaft fixedly mounted to the housing, and wherein the button is rotatable relative to the housing; and,
   a locking element connected to the button, the locking element capable of engaging or disengaging the at least one hole.

2. The reciprocating saw as claimed in claim 1, wherein a cutting direction of the blade is aligned with a swing direction of the reciprocating shaft when the locking element engages the at least one hole.

3. The reciprocating saw as claimed in claim 1, wherein the reciprocating shaft driven by the cam surface comprising at least two motion states;
   a first state, wherein the cam surface positions the reciprocating shaft to contact a sloping surface of a gear, the gear capable of cycle rotating motions, the cycle rotating motions of the sloping surface of the gear prompting the reciprocating shaft to move in a cycle swing motion cooperating with reciprocating motions to swing the reciprocating shaft around the shaft fixedly mounted to the housing periodically; and,
   a second state, wherein the cam surface positions the reciprocating shaft so the reciprocating shaft is disconnected from the sloping surface of the gear and wherein the reciprocating shaft is capable of only reciprocating motions but not cycle swing motion.

4. The reciprocating saw as claimed in claim 3, wherein the reciprocating shaft is capable of being selected to be in the first state or the second state when the locking element engages the at least one hole.

5. A reciprocating saw comprising:
   a housing;
   a reciprocating shaft unrotatably connected relative to a blade;
   a rear handle;
   a forward handle between the housing and the blade, the forward handle being rotatably mounted to the housing and surrounding a portion of the reciprocating shaft, the reciprocating shaft being capable of sliding relative to the forward handle, but incapable of rotating relative to the forward handle;
   at least one hole positioned within the forward handle;
   a locking element for engaging or disengaging the at least one hole;
   a button having a rotatable shaft having a cam surface, the cam surface cooperating with the reciprocating shaft to drive the reciprocating shaft to swing around a shaft fixedly mounted to the housing, the button further cooperating with the locking element to change the orientation of the blade.

6. The reciprocating saw as claimed in claim 5, wherein the cutting direction of the blade is consistent with the swing direction of the reciprocating shaft when the locking element is positioned toward the at least one hole.

7. The reciprocating saw as claimed in claim 6, wherein the reciprocating shaft is capable of at least two positions driven by the cam surface comprises at least two motion states.

8. The reciprocating saw as claimed in claim 7, wherein the motion states include a first cycle motion state, wherein the reciprocating shaft connects to a sloping surface of a gear, the gear capable of cycle rotating motions, the cycle rotating motions of the sloping surface of the gear prompting the reciprocating shaft to move in a cycle swing motion cooperating with reciprocating motions to swing the reciprocating shaft around the shaft fixedly mounted to the housing periodically; and a second state, wherein the reciprocating shaft is disconnected from the sloping surface and wherein the reciprocating shaft is capable of only reciprocating motions.

9. The reciprocating saw as claimed in claim 5, wherein the button is mounted on the housing.

* * * * *